United States Patent [19]

Moir et al.

[11] Patent Number: 5,761,002
[45] Date of Patent: Jun. 2, 1998

[54] DISK CLAMP WITH CLAMP LOAD CARRYING BEAMS

[75] Inventors: Michael Bruce Moir, Newbury Park; Richard Gene Krum, Thousand Oaks, both of Calif.

[73] Assignee: Seagate Technology, Inc., Scotts Valley, Calif.

[21] Appl. No.: 767,712

[22] Filed: Dec. 17, 1996

Related U.S. Application Data

[60] Provisional application No. 60/008,750 Dec. 18, 1995.

[51] Int. Cl.[6] ............................................... G11B 17/08
[52] U.S. Cl. ............................................... 360/98.08
[58] Field of Search ........................... 360/98.08, 99.12

[56] References Cited

U.S. PATENT DOCUMENTS

| | | | |
|---|---|---|---|
| 4,918,545 | 4/1990 | Scheffel | 360/99.12 |
| 5,101,306 | 3/1992 | Johnson | 360/99.12 |
| 5,528,434 | 6/1996 | Bronshvatch | 360/99.12 |

*Primary Examiner*—A. J. Heinz
*Attorney, Agent, or Firm*—Edward P. Heller, III; Raghunath S. Minisandram

[57] ABSTRACT

A disc clamp for securing a plurality of information storage discs to a spindle hub on a disc drive motor assembly comprising an annular inner wall portion, an annular outer ring portion, a plurality of clamp load beams extending radially from the annular inner wall portion to the annular outer ring portion and a plurality of eyelets extending radially from the annular inner wall portion for receiving screws that couple the disc clamp to the spindle hub.

10 Claims, 2 Drawing Sheets

DISK CLAMP WITH CLAMP LOAD CARRYING BEAMS

This application claims the benefit of provisional application no. 60/008,750, filed on Dec. 18, 1995, entitled Disc Clamp and Spacer, and now abandoned.

The present invention relates generally to an improved disc clamp for securing rotational information storage discs within disc drives.

BACKGROUND OF THE INVENTION

Disc drive machines record and reproduce information stored on a recording media. Conventional Winchester-type disc drives include a plurality of vertically-aligned, rotating information storage discs, each having at least one associated magnetic head that is adapted to transfer information between the disc and an external computer system. The information storage discs are journaled about a spindle motor assembly capable of rotating the discs at high speeds. The heads are carried by a plurality of vertically-aligned, elongated flexure arms that in turn are carried by a head positioner assembly. The head positioner assembly is adapted to move the heads back and forth in unison across the face of the vertically-aligned discs. The head positioner assemblies are traditionally either rotationally mounted, or take the form of a carriage that is free to move back and forth along a single axis. In either case, the head positioner assembly is adapted to precisely position the heads relative to the magnetic information storage discs.

The spindle motor assembly includes a rotatable spindle hub that is carried by a fixed spindle shaft securely mounted to the housing. A plurality of information storage discs are journaled about the spindle hub. Spacer discs are provided between adjacent information storage discs. The vertically aligned information storage discs are clamped to the spindle hub by a disc clamp secured by a plurality of screws.

In practice, the disc clamp design is quite critical to high performance disc drives and there are several design criteria that must be met in order to provide an effective disc clamp. Specifically, the disc clamp must provide a uniform clamping force along its clamping surface to avoid such problems as top disc distortion. The clamp must also be designed to uniformly distribute its internal stress' in order to minimize clamping force variations due to thermal expansions. Similarly, to facilitate installation and repair of the discs, it is important that resultant stress distribution within the clamp be relatively independent of the sequence in which the clamp screws are attached and the magnitude of the intermediate torques applied during installation.

Another drawback of many prior art disc clamps is that the screws that secure the disc clamp to the spindle hub tend to loosen as a result of thermal cycling of the drive due to stress imbalances with the clamp.

Although several suitable disc clamps have been designed in the past, effective disc clamp designs have traditionally required expensive alloys with high yield strength to accommodate the high stress concentration. However, the use of specialized alloys significantly increases production costs and fabrication complexity.

Further, one of the drawbacks of prior art disc clamps that have used screws as an attachment means is that the disc clamp is designed through an iterative process that begins with the creation of a force deflection curve and torque-deflection measurements that establish the relationship between the screw-tightening torque and the actual clamping force applied by particular disc clamps. Non-operating shock tests are performed using an actual drive to determine the minimum screw tightening torque needed to maintain the discs in place without any disc slippage.

Further, in the prior art, the use of screws creates localized point loading, thus not inherently providing equal clamping over the 360° contact surface.

SUMMARY OF THE INVENTION

Accordingly, it is an objective of the present invention to provide a novel disc clamp design that uses screws as a method of attachment only, without any localized point loading.

It is a further object of this invention to use the material, thickness and temper of the disc clamp to determine the clamp force, independent of the screw-tightening torque.

It is a further objective of this invention to provide equal clamping load over the 360° contact surface.

To achieve the foregoing and other objects in accordance with the purpose of the present invention, a disc clamp is provided for use within a disc drive to secure a plurality of information storage discs arranged as a disc pack to a spindle hub on a spindle motor assembly disposed within the drive. The disc clamp is secured to the spindle hub by a plurality of hub screws. The disc clamp further having an annular inner wall portion and an annular outer ring portion. Plurality of clamp load beams extend radially from the annular inner wall portion to the annular outer ring portion. Plurality of eyelets extend from the annular inner wall portion to receive the hub screws.

The outer ring portion further having a rounded convex surface which rests on the information storage discs and applies the clamp load. The clamp force is applied through the clamp load beams, thus providing an uniform clamp load over the 360° contact surface of the outer ring. The outer ring further having a lip which can be used to receive internal type snap rings for the purpose of balancing the disc pack assembly. In the preferred embodiment, the rounded convex surface is below the eyelets.

In an alternate embodiment, the annular inner wall portion is extending axially below the eyelets, so that the wall can aid in the centering of the disc clamp during the assembly process, by abutting to the inner wall of the hub.

DETAILED DESCRIPTIONS

As is generally known in the art, the illustrative disc drive unit 10 includes a head positioner assembly (not shown) mounted within the housing 16 at a position along the disc stack. The head positioner assembly supports a plurality of individual arms having electromagnetic transducer heads at the distal ends there of in close proximity with respective upper and lower surfaces on the information storage disks. A suitable actuator motor (not shown) such as a movable coil DC motor, and a corresponding motor controller function to displace the magnetic transducer head through generally radial traverses relative to the information storage disks 14 for the purposes of reading and writing data, all in a well known manner.

Figure 1A:
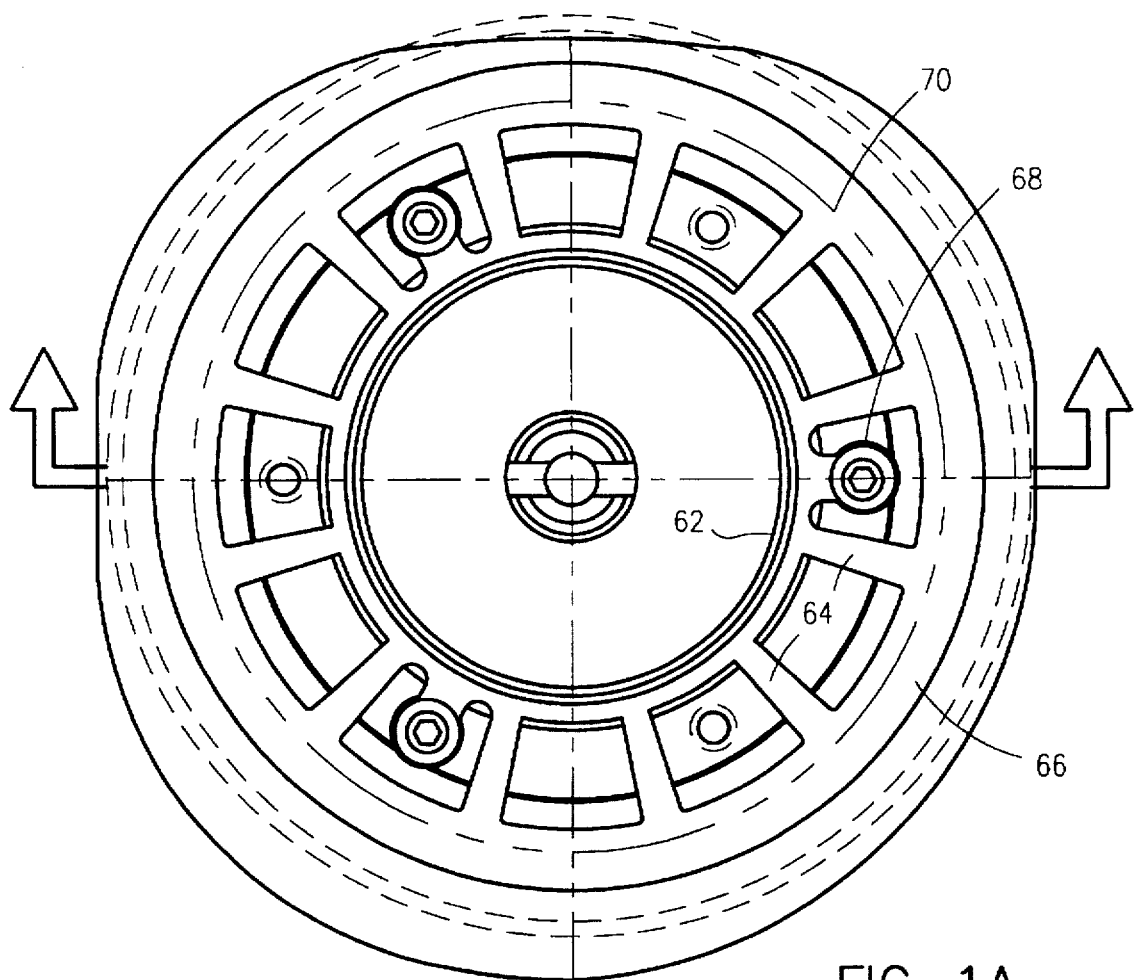
FIGS. 1a and 1b are the plan and sectional elevational view through a partial disc drive unit showing novel disc clamp of the present invention.
Figure 1B:
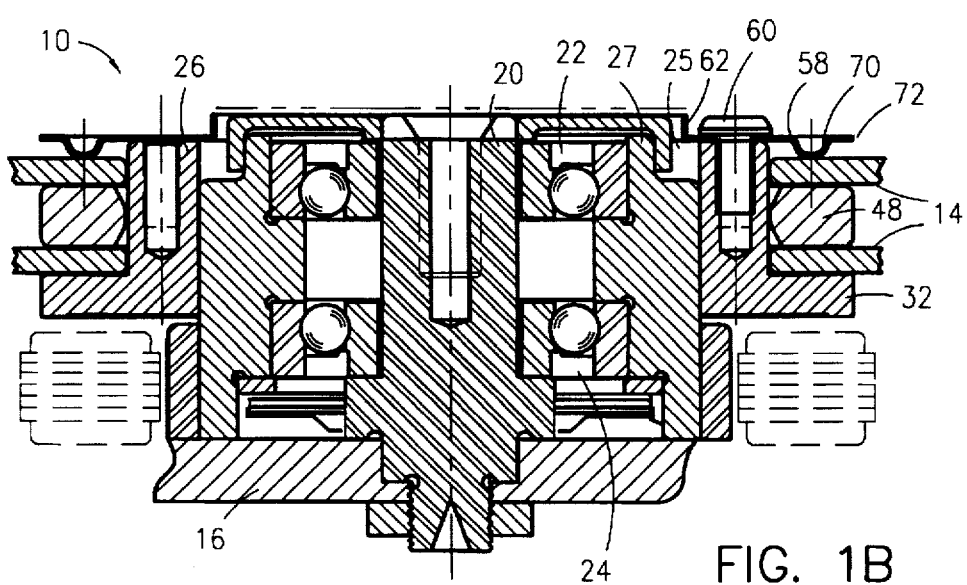

With reference to FIG. 1, a central shaft 20 is securely fixed to a portion of the housing lower base 16, and the information storage disks 14 are mounted for rotational movement within the housing 16 about the shaft 20. Central shaft 20 is also attached to the inner races of upper bearing and lower bearing.

The outer races of the upper bearing 22 and the lower bearing 24 support the rotor of the spindle motor. The rotor 25 includes sleeve 27 and spindle hub 26. Sleeve 27 is preferably stainless steel and spindle hub 26 is preferably aluminum. Spindle hub 26 is preferably heated and shrink fit over the outer surface of the sleeve 27 to securely attach spindle hub 26 and sleeve 27. The sleeve has a radially and inwardly extending middle flange on which the outer races of the upper bearing 22 and lower bearing 24 rest. The sleeve supports, at its lower end, a plurality of permanent magnets which interact with an electromagnetic stator core to rotate the spindle hub about the center shaft in a known manner.

The spindle hub near the lower end, has a radially and outwardly extending hub flange 32. A first information storage disc 14 is stacked on top of the hub flange 32. A disc spacer 48 is stacked on top of the first information disc and a second disc 14 is stacked on top of the disc spacer 48. A novel disc clamp 58 of the present invention is connected to the upper surface of the spindle hub via plurality of screws 60, features of which will be fully explained below.

The disc clamp 58 includes an axially extending annular inner wall portion 62. Plurality of clamp load beams 64 extend radially from the annular inner wall portions 62, to the annular outer ring portion 66. Plurality of eyelets 68 extend from the annular inner wall portion to receive the hub screws 60.

The clamp load beams 64 are designed to yield allowing the screws 60 to draw up tight against the top of the spindle hub 26. The formed inner wall portion 62 provides strength to distribute the clamping load equally over the 360° contact surface.

The outer ring portion 66 further having a rounded convex surface 70 which rests on the second information storage disc and applies the clamp load. The clamp load is applied through plurality of clamp load beams 64, thus providing an uniform clamp load over the 360° contact surface of the outer ring.

The outer ring portion 66 further having a lip 72 which can be used to receive internal type snap rings for the purpose of balancing the disc pack assembly. In the preferred embodiment, the rounded convex surface 70 is below the eyelets 68.

Figure 2A:
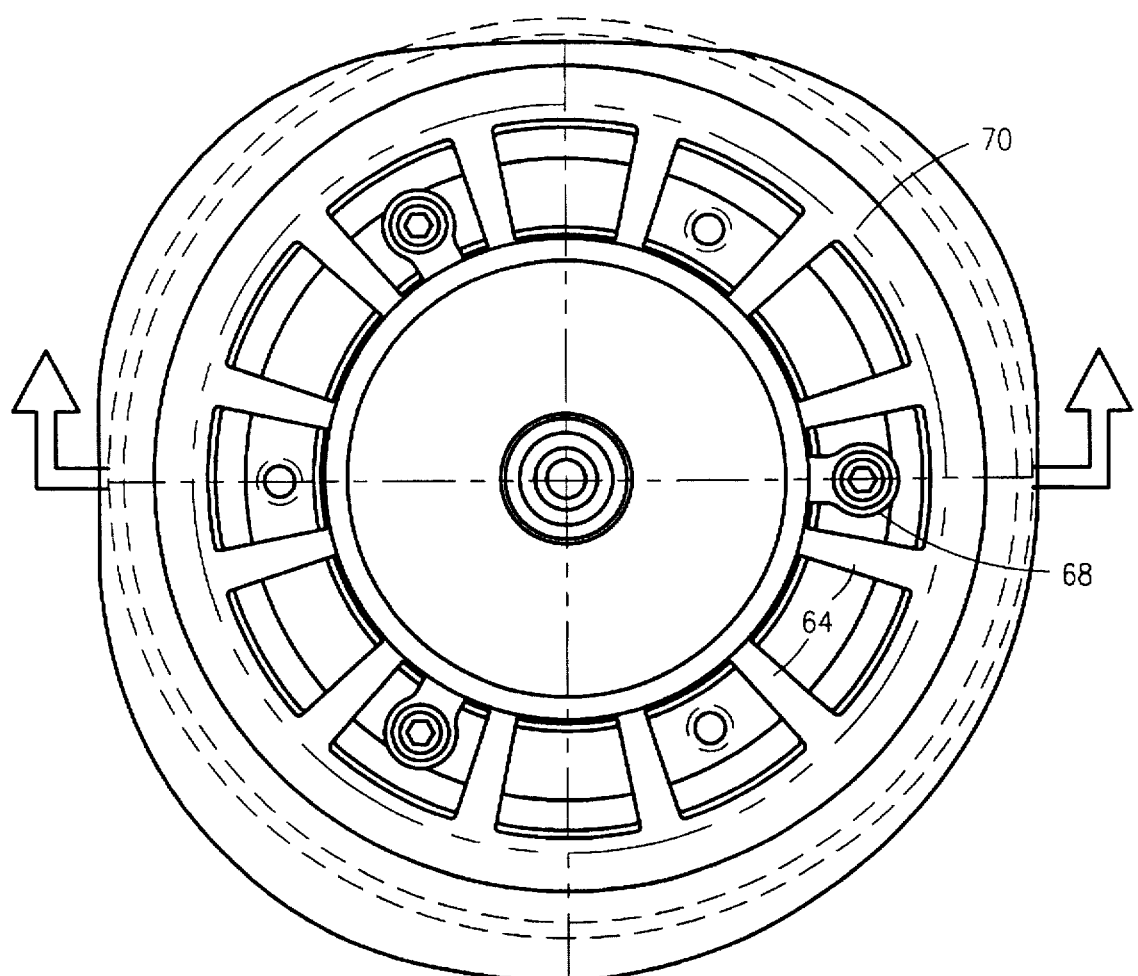
FIGS. 2a and 2b are the plan and sectional elevational view through a partial disc drive unit showing an alternate embodiment of the novel disc clamp of the present invention.
Figure 2B:
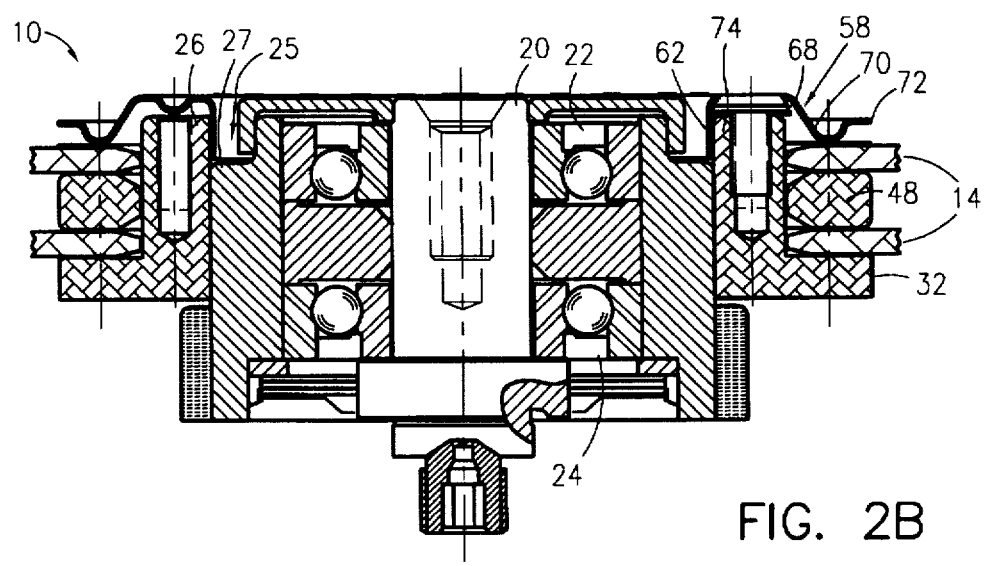

FIGS. 2a and 2b shows an alternate embodiment of the novel disc clamp, wherein like reference numerals represent like elements. FIG. 2 clearly shows that the axially extending annular inner wall portion 62 is extending axially downwards, below the eyelets 68 and abuts against the inner surface 74 of the spindle hub 26, so that the annular inner wall portion 62 can aid in centering the disc clamp 58 during the assembly process.

Even though this disclosure discloses a disc drive with two information storage discs, the novel invention can be applied to a disc drive having just one information storage disc or more than two information storage discs. Further, the invention can be practiced on both rotating spindle or rotating shaft type disc drives. Further, a disc clamp can be designed according to teachings of this invention wherein both the load carrying beams and the eyelets could yield or just the eyelets yield during the tightening of the screws, yet applying clamping load to the disc pack via the load carrying beams.

From the above description, it is apparent that many modifications and variations of the present invention are possible in light of the above teachings. It is therefore to be understood that, within the scope of the appended claims, the invention may be practiced otherwise than as specifically described hereinabove.

We claim:

1. A disc clamp for securing a plurality of information storage discs to a spindle hub on a disc drive motor assembly comprising:

an annular inner wall portion;

an annular outer ring portion;

plurality of clamp load beams extending radially from said annular inner wall portion to said annular outer ring portion;

plurality of eyelets extending radially from said annular inner wall portion for receiving screws that couple said disc clamp to the spindle hub.

2. The disc clamp of claim 1, wherein said annular outer ring portion further having a lip.

3. The disc clamp of claim 1, wherein said annular outer ring portion further having a rounded convex surface suitable for contact with an information storage disc.

4. The disc clamp of claim 3, wherein said rounded convex surface is below said eyelets.

5. The disc clamp of claim 4 wherein said annular inner wall portion is extending axially below said eyelets.

6. A disc drive system comprising:

a spindle hub, a plurality of information storage discs journaled about said spindle hub in spaced apart, vertically aligned relation, said information storage discs being coupled to said spindle hub to rotate with the spindle hub;

a plurality of magnetic transducer heads for writing information onto the information storage discs and for reading information out from the information storage discs;

a head positioner assembly for positioning the transducer heads relative to the information storage discs;

a disc clamp for securing the information storage discs to the spindle hub on a disc drive spindle motor assembly including:

an annular inner wall portion;

an annular outer ring portion;

plurality of clamp load beams extending radially from said annular inner wall portion to said annular outer ring portion;

plurality of eyelets extending radially from said annular inner wall portion for receiving screws that couple said disc clamp to the spindle hub.

7. The disc clamp of claim 6, wherein said annular outer ring portion further having a lip.

8. The disc clamp of claim 6, wherein said annular outer ring portion further having a rounded convex surface suitable for contact with an information storage disc.

9. The disc clamp of claim 8, wherein said rounded convex surface is below said eyelets.

10. The disc clamp of claim 9 wherein said annular inner wall portion is extending axially below said eyelets.

* * * * *